United States Patent [19]

Ohtsuki et al.

[11] Patent Number: 4,699,458
[45] Date of Patent: Oct. 13, 1987

[54] FIBER OPTIC CONNECTOR

[75] Inventors: Tomonari Ohtsuki; Masaru Ishii; Mitsuru Takeda, all of Tochigi, Japan

[73] Assignee: Allied Corporation, Morris Township, Morris County, N.J.

[21] Appl. No.: 586,513

[22] Filed: Mar. 5, 1984

[30] Foreign Application Priority Data

Mar. 10, 1983 [JP] Japan .............................. 58-33532[U]

[51] Int. Cl.⁴ ............................................... G02B 6/36
[52] U.S. Cl. .............................. 350/96.21; 350/96.20
[58] Field of Search ........................... 350/96.21, 96.22

[56] References Cited

U.S. PATENT DOCUMENTS

| | | | |
|---|---|---|---|
| 3,910,678 | 10/1975 | McCartney et al. | 350/96.21 |
| 3,914,015 | 10/1975 | McCartney | 350/96.22 |
| 3,947,182 | 3/1976 | McCartney | 350/96.22 |
| 3,948,582 | 4/1976 | Martin | 350/96.21 |
| 3,963,323 | 6/1976 | Arnold | 350/96.22 |
| 3,990,779 | 11/1976 | McCartney | 350/96.21 |
| 4,015,894 | 4/1977 | Rocton | 350/96.21 |
| 4,127,319 | 11/1978 | Forney, Jr. et al. | 350/96.20 |
| 4,140,366 | 2/1979 | Makuch et al. | 350/96.22 |
| 4,140,367 | 2/1979 | Makuch et al. | 350/96.22 |
| 4,168,109 | 9/1979 | Dumire | 350/96.22 |
| 4,392,713 | 7/1983 | Piter et al. | 350/96.21 |
| 4,396,248 | 8/1983 | Bientz et al. | 350/96.21 |
| 4,411,491 | 10/1983 | Larkin et al. | 350/96.21 |
| 4,415,232 | 11/1983 | Caron | 350/96.21 |
| 4,444,461 | 4/1984 | Wey et al. | 350/96.21 |
| 4,515,434 | 5/1985 | Margolin et al. | 350/96.21 |

FOREIGN PATENT DOCUMENTS

| | | |
|---|---|---|
| 0063085 | 4/1982 | European Pat. Off. . |
| 2759002 | 7/1979 | Fed. Rep. of Germany ... 350/96.21 |
| 2045545 | 3/1979 | United Kingdom . |

OTHER PUBLICATIONS

Patent Abstracts of Japan, vol. 4, No. 107 (p. 21), 6th Oct. 1980, Nippon Denshin Denwa Kosha.
Review of the Electrical Communication Laboratories, vol. 27, Nos. 11-12, Nov.-Dec., 1979, pp. 999-1009, Tokyo, Japan; N. Suzuki et al.: "Demountable Connectors for Optical Fiber Transmission Equipment.

Primary Examiner—William L. Sikes
Assistant Examiner—Akm E. Ullah
Attorney, Agent, or Firm—A. Jose Cortina; Roger H. Criss

[57] ABSTRACT

A fiber optic connector, especially for multiple-core fiber optic cables, in which a ferrule (2), mounted in a ferrule insert (3), and adapted to receive the optical fiber (P), is provided in a plug (A,B). An adaptor (C) is provided for receiving the plug, and includes a holding sleeve (11) which is retained in an insert (10). A split sleeve (12) is mounted in the holding sleeve (11) for receiving the ferrule (2). A terminal part (11b) of the holding sleeve protrudes from the surface of the insert (10) and is snugly received in an insertion recess (14) provided at the forward end of the ferrule insert (10). The terminal part (11b) enters recess (14) after the ferrule (2) has entered the split sleeve (12) at the time of connection of the plug and adaptor.

10 Claims, 14 Drawing Figures

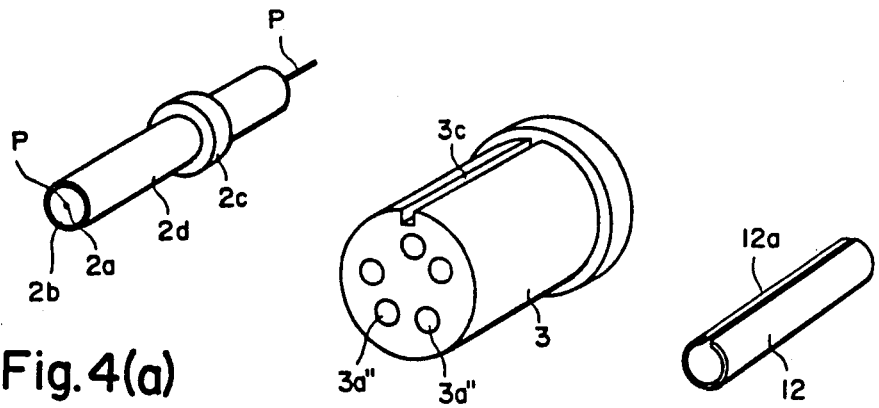
Fig.4(a)
PRIOR ART
Fig.4(b)
Fig.4(c)
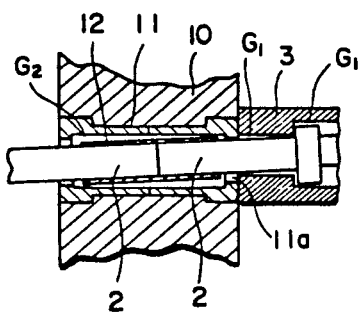
Fig.5
PRIOR ART

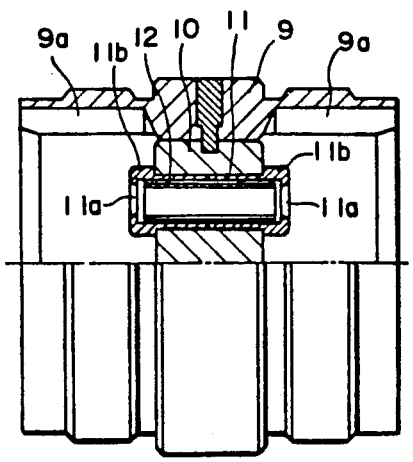
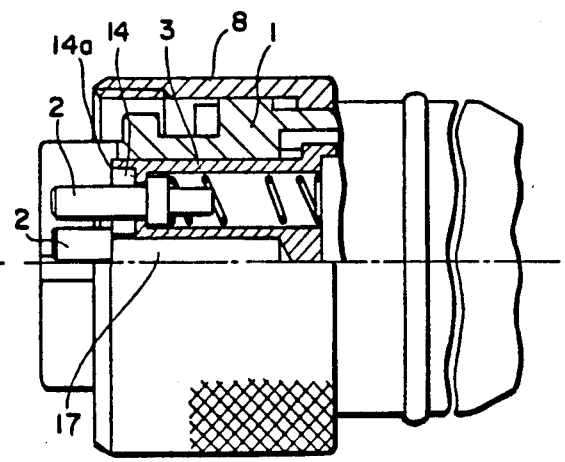
Fig.6(b)　　　　Fig.6(a)
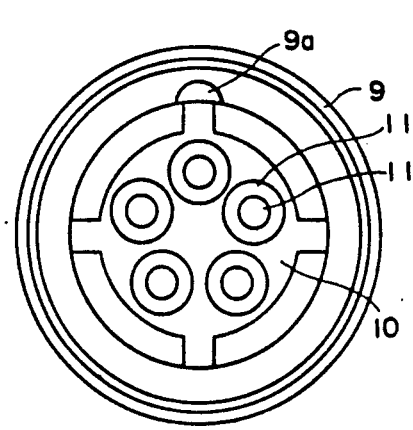
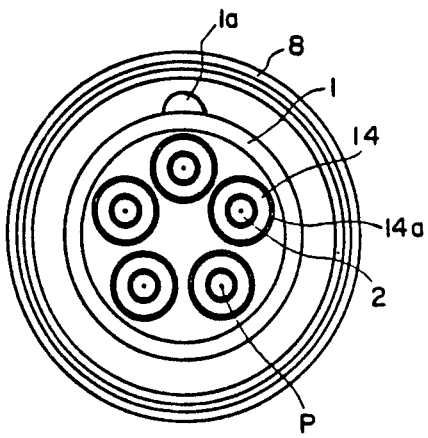
Fig.7(b)　　　　Fig.7(a)

4,699,458

FIBER OPTIC CONNECTOR

BACKGROUND OF THE INVENTION

1. Field of the Invention

This invention relates to fiber optic connectors, and in particular to connectors for multiple-core fiber optic cables.

2. BACKGROUND OF THE INVENTION

Connectors for multiple core fiber optic cables have heretofore been utilized. In general, these connectors include a plug into which the optical fibers are inserted and an adaptor to connect two plugs. Individual ferrules are provided to receive the optical fibers and the ferrules are mounted in ferrule inserts. The adaptor includes inserts which receive the ferrules of two plugs when they are mated with the adaptor. In order to assist in the alignment of the optical fibers from one plug to another, an alignment protrusion is provided on each plug to be received in alignment grooves provided on opposite ends of the adaptor.

However, it is difficult to accurately position these alignment protrusions and grooves on the plugs and adaptor in order to achieve the required high degree of concentricity to enable transmission of light with reduced distortion. In order to assist in the alignment, a split sleeve is typically used in the ferrule inserts. A certain degree of "play" is required between the alignment protrusions and grooves in order to permit insertion of the ferrules into the split sleeves. However, this allows the plugs to rotate with respect to the adaptor, with the result that the ferrules become misaligned.

It would be desirable to provide a connector for optical fibers in which misalignment of the fibers were reduced in a simple and expedient manner.

SUMMARY OF THE INVENTION

In accordance with this invention, there is provided in a connector for optical fibers including a plug having at least one ferrule mounted in a ferrule insert provided in the plug, the ferrule having a forward portion extending outwardly from a forward end of the ferrule insert, the ferrule insert being adapted to receive an optical fiber, and an adaptor for receiving the plug, the adaptor including a holding sleeve to receive the ferrule, the holding sleeve being retained in an adaptor insert provided in the adaptor, the improvement comprising:

the holding sleeve of the adaptor including a terminal part protruding from the surface of the adaptor insert; and a recess provided at the forward end of the ferrule insert, the recess being dimensioned to snugly receive the terminal part of the holding sleeve at the time of connection of the plug and the adaptor.

Preferably, the connector includes a split sleeve mounted in the holding sleeve for receiving the ferrule, the terminal part of the holding sleeve entering the recess of the ferrule insert after the ferrule has entered the split sleeve at the time of connection of the plug and adaptor. Also, preferably the connector is adapted to receive multiple-core fiber optic cables.

This invention provides a fiber optic connector which greatly reduces rotation of the ferrules and provides for precise alignment of the optical fibers. The connector permits a high level of light transmission, in a simple and cost effective manner.

BRIEF DESCRIPTION OF THE DRAWINGS

FIGS. 4(a), 4(b) and 4(c) are perspective views of the ferrule, ferrule insert and split sleeve components of the prior art connector.

FIG. 5 is a cross-sectional view showing the connection in the prior art connector.

FIG. 6(a) is a longitudinal cross-sectional view of the plug of the connector of this invention.

FIG. 6(b) is a longitudinal cross-sectional view of the adaptor of the connector of this invention.

FIG. 7(a) is a front view of the plug of FIG. 6(a).

FIG. 7(b) is a front view of the adaptor of FIG. 6(b).

DESCRIPTION OF THE PREFERRED EMBODIMENTS

Before describing the improvements of this invention, it would be helpful to describe the prior art device of FIGS. 1-5.

Figure 1A:
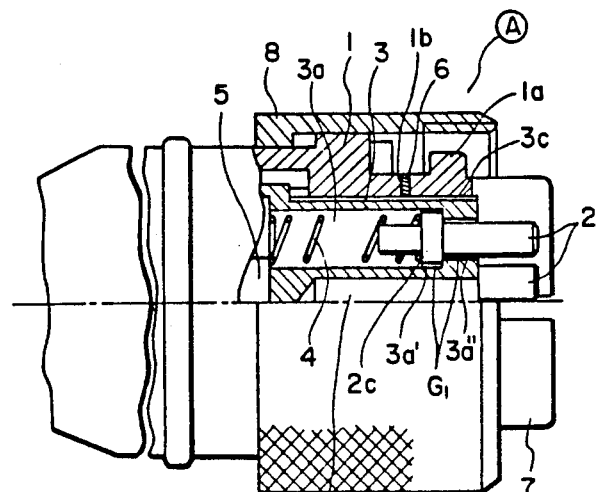
FIGS. 1(a), 1(b) and 1(c) are longitudinal cross-sectional views of the left hand plug, the right hand plug and the adaptor, respectively, of a prior art connector.
Figure 1B:
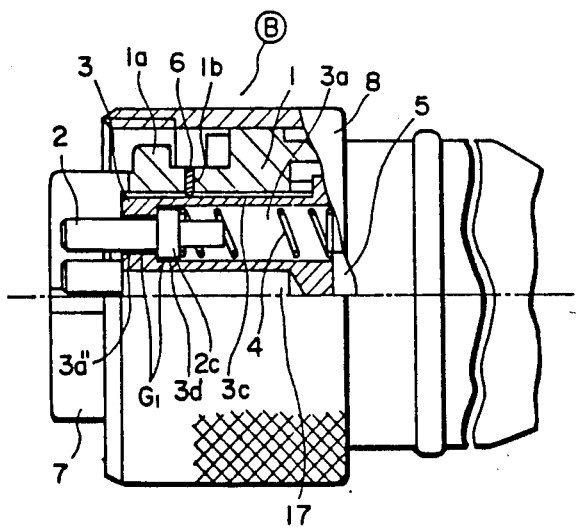
Figure 1C:
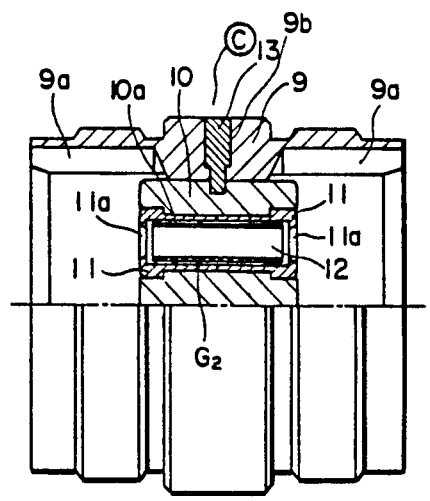
Figure 2:
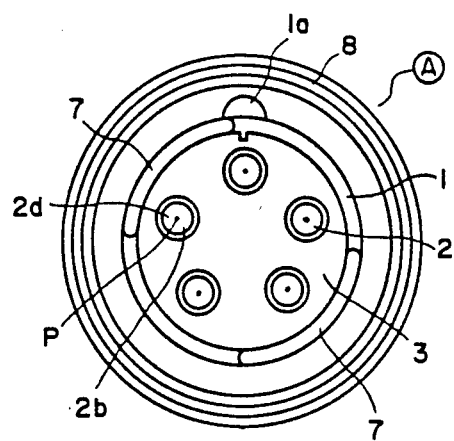
FIG. 2 is a front view of the plug of FIG. 1(a).
Figure 3:
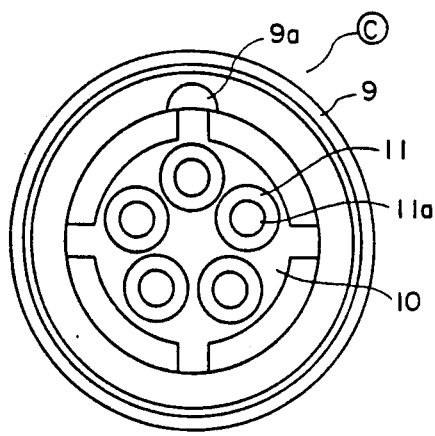
FIG. 3 is a front view of the adaptor of FIG. 1(c).

The connector of FIGS. 1-5 is used in the mutual connection of multiple-core optical fiber cables. This connector comprises plugs (A) and (B) to which a cable to be connected is fixed, as shown in FIGS. 1(a), 1(b) and 2, and an adaptor (C) which connects the plugs (A) and (B), as shown in FIGS. 1(c) and 3.

The plugs include a front body 1 which is provided with an alignment protrusion 1a for position determination and insertion into an alignment groove 9a provided at both ends of the body 9 of the adaptor (C). Plugs (A) and (B) are inserted in a certain positional relationship through the adaptor (C) to mutually connect the optical fibers together.

A ferrule 2 is provided in body 1 to receive the fibers. As is shown in FIG. 4(a), for instance, ferrule 2 comprises a tubular part 2b made of ceramic having an insertion hole 2a at its center to receive optical fiber P, and a tubular metal part 2d surrounding tubular part 2b and having an outer peripheral support collar 2c adjacent one end thereof. An extremely high level of concentricity is provided between the insertion hole 2a and the outer peripheral surface of the metal part 2d.

A ferrule insert 3 is provided in body 1 and includes a ferrule support hole 3a comprising a first insertion hole 3a' into which the aforementioned support collar 2c of ferrule 2 is inserted in such a manner as to possess a suitable "play", and a second insertion hole 3a'' of a small diameter which is provided coaxially with hole 3a and inserted in such a manner that the metal part 2d may have a "play" $G_1$. (See FIGS. 1(a) and 1(b).) As an example, five support holes are provided on the same circumference which is coaxial with the ferrule insert 3 at an equal distance from each other.

A coil spring 4 is provided between a separate washer 5 which is pressed to the one end of the ferrule insert 3 and the support collar 2c of the ferrule 2. The ferrule 2 is half-fixed in such a manner as to freely move back and forth by pushing the support collar 2c to the side of the second insert hole 3a'' until it hits the bottom of the first insert hole 3a' and, at the time when the ferrules 2 of the plugs (A) and (B) are connected in such a way as to face each other, the same is compressed and generates a sufficient retaining force.

The ferrule insert 3 into which ferrule 2 has been mounted is fixed in body 1 in such a fashion that the aforementioned alignment protrusion 1a and ferrule 2 may assume a fixed positional relationship by a fixed groove 3c which is provided in the central axial direction on the outer peripheral surface, as shown in FIG. 4(b), an aperture 1b provided in body 1 in a direction which is at a right angle with the central axis, and a pin 6 which is set into the aperture.

A protective wall 7 protects the ferrule from outside forces. The body 1 is connected to the adaptor by means of a coupling nut 8.

The adaptor (C) includes an adaptor body 9, an alignment positioning groove 9a, an adaptor insert 10 and a holding sleeve receiving hole 10a, five of which are provided (being the same as the number of the ferrules) at an equal distance on the same circumference having the same diameter as the circumference for the aforementioned ferrule support hole 3a and on the same axis as the adaptor insert 10.

A holding sleeve 11 is provided in the adaptor and comprises two parts of the same shape each of which has a ferrule insertion hole 11a and is formed by being compressed from both ends of the sleeve receiving hole 10a of the adaptor insert 10. A longitudinal split sleeve 12 is received in sleeve 11. As shown in FIG. 4a, for the entire length of the direction of the central axis of the sleeve 12, there is provided a cut 12a which produces a spring force at the time when the ferrules 2 of the plugs (A) and (B) have been inserted. Holding sleeve 11 is dimensioned in such a manner as to have a size which has a proper "play" $G_2$. (FIG. 1c)

At this juncture, when respective ferrules 2 of the plugs (A) and (B) are inserted into split sleeve 12 to face each other, the ferrules retrogress in opposition to the force of the aforementioned coil spring 4, so that there will be produced a compressive force.

In addition, adaptor insert 10 which receives the holding sleeve 11, etc. is fixed to body 9 by means of an aperture 9b provided on the body 9 and a pin 13 which is to be set into the aperture in such a manner that the ferrules 2 of the plugs (A) and (B) and the central axis of the ferrule insertion hole 11a of the holding sleeve 11 on the adaptor (C) may approximately become coaxial at the time when the aforementioned alignment protrusion 1a has been inserted into its alignment groove 9a.

In such a connector, even if there may be some dimensional errors in the body 1, ferrule insert 3, body 9 and adaptor insert 10, etc., and even if the coaxiality of the various ferrules 2 of the plugs (A) and (B) which are caused to face each other may be somewhat impaired, there takes place an automatic correction by the aforementioned "play" $G_1$ and $G_2$ of the plugs (A) and (B) and the adaptor (C) and the split sleeve 12, with a result that coaxiality is achieved and that a satisfactory transmission of light can be carried out.

If the ferrule 2 is made in such a manner as to be moved by the play $G_1$ alone and if the split sleeve 12 is also made to move by the play $G_2$, the split sleeve 12 will move in such a manner as to align with the central axis of both ferrules 2 at the time when the ferrules 2 have been inserted into the split sleeve 12 from both ends.

Simultaneously with this, further, the ferrules 2 are forced in such a way as to be positioned along the inner peripheral surface of the split sleeve 12 which has a high degree of linearity, with a consequence that both ferrules 2 are held coaxially. even if this is done, it is not sufficient to connect the optical fibers having such a small diameter on the order of a micron by maintaining a high degree of coaxiality.

In the aforementioned conventional connector, it is difficult to accurately provide the alignment protrusion 1a and alignment groove 9a at such locations as are required on the bodies 1 and 9. Moreover, it is difficult to eliminate the errors of the fixed position which are based on the ferrule insert 3, adaptor insert 10 the bodies 1 and 9 and other dimensional errors.

If, for this purpose, the alignment protrusion 1a is made in such a manner as to enter the alignment groove 9a without any "play", there is produced a difference in position between the ferrules 2 and the ferrule insertion hole 11a of the holding sleeve 11, with a result that it becomes impossible to insert the ferrule 2 into the split sleeve 12.

For this reason, there is intentionally provided a substantially large "play" in the alignment protrusion 1a and alignment groove 9a in ordinary cases. However, this will produce a leeway for the plugs (A) and (B) to rotate in the peripheral direction as compared with the adaptor (C) by the play portion. This means that the base of the ferrule 2 which has been inserted into the split sleeve 12 of the adaptor (C) is pushed in the peripheral direction by the ferrule insert 3.

Because of this, in the case where one of the plugs (A) has been rotated in the circumferential direction as compared, for instance, with the adaptor, the terminal side of the ferrule 2 on the side of the plug (A) which has been corrected in such a manner as to possess coaxiality by such means as a split sleeve 12 will be inclined, in a direction which is opposite to the rotation in the peripheral direction, while expanding the split sleeve 12, by using the compact point with the insertion hole 10a of the holding sleeve 11 based on the "play" $G_1$ as the fulcrum.

Such a state as described above becomes larger at the time when rotations which are in opposite directions are given to the plugs (A) and (B), in particular. Accordingly, the connection between the optical fibers is prevented each time such a rotation in the peripheral direction is given.

Moreover, in the case where this state of rotation in the peripheral direction has become permanent by the fixing of the plugs (A) and (B) and the adaptor (C) themselves by the coupling nut 8, the impairment of the coaxiality between the optical fibers themselves becomes permanent, with a result that there is produced a gap in the fibers and the transmission of light is greatly inhibited.

This invention eliminates such difficulties as have been described above by simple means and is characterized in that, as shown in FIGS. 6 (a) and (b) and in FIGS. 7 (a) and (b) (only the plug (B) and adaptor (C) being shown, the terminal part 11b of the holding sleeve 11 is caused to protrude from the surface of the adaptor insert 10, and, at the same time, the ferrule insert 3 is provided with an insertion recess 14 surrounding the ferrule and having a guide slanted surface 14a at the entrance into which the terminal part 11b of the aforementioned sleeve 11 fits snugly. Terminal part 11b surrounds ferrule insertion hole 11a.

In this manner, the terminal part 11b of the holding sleeve 11 enters the insertion recess 14 after the ferrule 2 has entered the split sleeve 12 at the time of the connection, with the positions of the adaptor (C) and the plugs (A) and (B) being fixed. Even if there is provided a "play" between the alignment protrusion la and alignment groove 9a as described above, therefore, there will not result in a rotation in the peripheral direction in the neighborhood of the base of the ferrule 2 due to the rotation in the peripheral direction of plugs (A) and (B). Accordingly, the possibility of producing a gap that will inhibit the transmission of light between the opposing terminal faces of the optical fiber is greatly reduced.

Since the insertion recess 14 is made coaxially with the insertion hole 3a' of the ferrule support hole 3a, in addition the insertion recess 14 can be prepared by merely changing the diameter of a drill without changing the relation of the metal material to the machine tool during machining. Accordingly, it can be prepared in a simple manner by maintaining a high level of coaxiality with the ferrule insertion hole 3a' into which the terminal part 11b of the holding sleeve 11 enters perfectly without requiring a high level of precision tooling. As a consequence, the connector has a high level of light transmission, without incurring a high rise in manufacturing costs.

Figure 8:
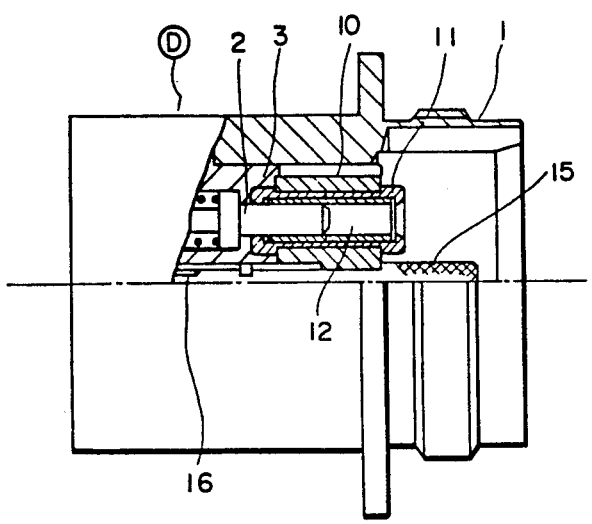
FIG. 8 is a longitudinal cross-sectional view of the connector of this invention in which one of the plugs is a receptacle.

In the case where one of the plugs (A) and (B) is used as a receptacle, as shown in FIG. 8, the adaptor insert 10 of the adaptor (C) which has been described earlier screws a screw 15 into a screw hole 16 which is provided at the center of the receptacle (D) in such a manner that the ferrule 2 of the receptacle (D) may enter the split sleeve 12 in a manner similar to that of FIG. 6.

Even in this case, the purpose can be achieved by providing a recess 14 for the insertion of the terminal end 11b of the holding sleeve 11 on the ferrule insert of the plug (A). It is mentioned in this connection that it is necessary to provide a recess 17 on plug (A) for the installation screw 15 as shown in FIGS. 1a, 1b and 6a, at the center of the plug that is to be connected.

The present invention therefore provides an improved design for a fiber optic connector. Although the invention has been particularly described with respect to a multiple core fiber optic cable, the invention is likewise suitable for a single fiber optic connector.

What is claimed is:

1. In a connector for connecting multiple-core optical fiber cables, said connector of the type comprising a plug having a plurality of ferrules mounted in a corresponding plurality of ferrule inserts provided in said plug, and said ferrules being held in said ferrule inserts with a predetermined amount of play and an adaptor for receiving said plug in a predetermined position and with a predetermined amount of play to permit said plurality of ferrules to be received thereby, said adaptor further comprising a corresponding plurality of holding sleeves, each for receiving respectively a ferrule of said plurality of ferrules, and each one of said plurality of holding sleeves being retained by respective ones of a corresponding plurality of adaptor inserts provided in said adaptor, the improvement comprising:

each one of said plurality of holding sleeves of said adaptor including a terminal part protruding from the surface of respective ones of said adaptor inserts; and a recess provided at the forward end of respective ferrule inserts, said recesses being dimensioned to snugly receive said respective terminal parts of said holding sleeves at the time of connection of said plug and said adaptor, whereby properly aligned reception of the respective ferrules in the respective sleeves is ensured even upon repeated connections and disconnections.

2. The connector of claim 1 including a respective plurality of split sleeves, respectively mounted in said plurality of holding sleeves for receiving a respective plurality of said ferrules, said terminal parts of said holding sleeves entering said recesses of said ferrule inserts after said ferrules have entered said split sleeves at the time of connection of said plug and adaptor.

3. The connector of claim 2 wherein the walls defining said recess of said ferrule inserts are slanted to guide said terminal to parts into said recesses.

4. The connector of claim 2 wherein said plug comprises a body member, said ferrule inserts being mounted within said body member.

5. The connector of claim 4 wherein said ferrule inserts each include aperture means slidably receiving said ferrules, and respective biasing means retained in said aperture means biasing said ferrules outwardly of said ferrule inserts.

6. The connector of claim 5 including coupling means to retain said plug and adaptor in a coupled condition.

7. The connector of claim 5 wherein said adaptor forms part of a receptacle, said receptacle including a mounting screw, and said body of said plug being provided with a recess to receive said mounting screw.

8. The connector of claim 5 including alignment means provided on each of said plug and adaptor for receiving said plug in said predetermined position with respect to said adaptor.

9. The connector of claim 9, wherein said alignment means comprises an alignment protrusion on the periphery of said body of said plug and a complementary alignment groove on said adaptor.

10. The connector of claim 2 wherein said adaptor is adapted to receive two of said plugs, one on each side of said adaptor, to align said optical fibers of said plugs, said plurality of holding sleeves of said adaptor each having opposite ends, and a terminal part protruding from the surface of a respective adaptor insert adjacent each end of each of said holding sleeves, one of said terminal parts entering the corresponding recess of the corresponding ferrule insert on one of said plugs, and the other of said terminal parts entering the corresponding recess of the corresponding ferrule insert on the other of said plugs, whereby said optical fibers are precisely optically aligned upon connection.

* * * * *